(12) United States Patent
Agata et al.

(10) Patent No.: US 7,709,097 B2
(45) Date of Patent: May 4, 2010

(54) GAS-BARRIER LAMINATE FILM AND IMAGE DISPLAY DEVICE COMPRISING SAME

(75) Inventors: Yuya Agata, Kanagawa (JP); Naoki Tsukamoto, Kanagawa (JP); Shun-ichi Ishikawa, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 26 days.

(21) Appl. No.: 11/902,895

(22) Filed: Sep. 26, 2007

(65) Prior Publication Data

US 2008/0081205 A1 Apr. 3, 2008

(30) Foreign Application Priority Data

Sep. 29, 2006 (JP) .............................. 2006-266935

(51) Int. Cl.
*B32B 15/04* (2006.01)
*B32B 27/00* (2006.01)

(52) U.S. Cl. .................. 428/500; 428/457; 428/461
(58) Field of Classification Search .................... None
See application file for complete search history.

(56) References Cited

U.S. PATENT DOCUMENTS 3,911,184 A * 10/1975 Caskey et al. ............. 428/35.4
7,297,414 B2 * 11/2007 Naruse et al. ............... 428/688

* cited by examiner

*Primary Examiner*—Sheeba Ahmed
(74) *Attorney, Agent, or Firm*—Birch, Stewart, Kolasch & Birch, LLP

(57) ABSTRACT

A gas-barrier laminate film comprising at least one inorganic layer and at least one organic layer comprising a polymer of an acrylic monomer as a main ingredient on a substrate film, wherein the organic layer comprises a polymerization product of a bi- or more-functional polymerizing monomer having at least one sulfonyl group. The laminate film is highly resistant to moisture penetration and applicable to flexible organic EL devices.

13 Claims, No Drawings

GAS-BARRIER LAMINATE FILM AND IMAGE DISPLAY DEVICE COMPRISING SAME

BACKGROUND OF THE INVENTION

1. Field of the Invention

The present invention relates to a gas-barrier laminate film having excellent gas-barrier capability. More precisely, the invention relates to a gas-barrier laminate film favorably usable in various image display devices, in particular, to a gas-barrier laminate film useful as a substrate for flexible organic electroluminescent devices (hereinafter referred to as "organic EL devices") and to a method for producing it, and also to an organic EL device.

2. Description of the Related Art

Heretofore, a gas-barrier laminate film fabricated by forming a thin metal oxide film of aluminium oxide, magnesium oxide or silicon oxide on the surface of a plastic substrate or a film is widely used for wrapping or packaging articles that require shielding from various gases such as water vapor or oxygen and for wrapping or packaging edibles, industrial articles and medicines for preventing them from being deteriorated. Apart from its applications for wrapping and packaging articles, in addition, the gas-barrier film is being used in liquid-crystal display devices, solar cells and EL devices.

In recent development of image display devices such as liquid-crystal display devices and EL devices, the transparent substrate to constitute these devices is required to be lightweight and has a large panel size and, in addition, it is further required to satisfy high-level requirements in that it has long-term reliability and has a lot of latitude in designing its shape and that it enables curved-face display. For the transparent substrate capable of satisfying such high-level requirements, a plastic substrate is being used as a new type of substrate substitutable for a conventional glass substrate that is heavy and readily cracked or broken and hardly worked into a large-size panel. Not only satisfying the above requirements, but also the plastic substrate is applicable to a roll-to-roll system, and therefore it is more advantageous than a glass substrate in that the producibility with it is high and the production cost with it is low.

However, the film substrate of transparent plastics or the like is problematic in that its gas-barrier property is inferior to that of a glass substrate. When a substrate having a poor gas-barrier property is used, water vapor and air may penetrate through it; and, for example, when it is used in liquid-crystal display devices, the liquid crystal in the liquid-crystal cell may be degraded and the degraded part may be a display failure, thereby worsening the display quality of the devices. For solving the problem, a gas-barrier laminate film that comprises a thin metal oxide film formed on a substrate film has been developed. For example, as a gas-barrier laminate film for use in wrapping materials and liquid-crystal display devices, there are known a plastic film coated with silicon oxide through vapor deposition (JP-B-53-12953), and a plastic film coated with aluminium oxide through vapor deposition (JP-A-58-217344). These have a water-vapor barrier level of 1 $g/m^2/day$ or so.

However, large-panel liquid-crystal display devices and high-definition display devices developed these days require plastic film substrates having a water vapor permeability of at most 0.1 $g/m^2/day$. Further recently, the development of organic EL devices and high-definition color liquid-crystal display devices is being more promoted, and they require transparent plastic film substrates having a transparency level applicable to them and having a further improved barrier capability (especially having a water vapor permeability of at most 0.01 $g/m^2/day$). To satisfy these requirements, some methods expected to produce a higher gas-barrier level have been investigated, for example, a sputtering method of forming a thin film by the use of a plasma generated through glow discharge under low pressure, and a CVD method for film formation. In addition, also proposed is an organic light-emitting device provided with a barrier film having an alternate laminate structure of organic layer/inorganic layer fabricated according to a vacuum evaporation method (U.S. Pat. No. 6,268,695, from page 4 [2-5] to page 5 [4-49]). Further, for giving the necessary folding resistance enough for application to flexible image displays to a plastic film, disclosed is a technique of using a polymer formed through polymerization of an acrylic monomer and having a volume shrinkage of less than 10% as an organic layer of the film (JP-A-2003-53881, from page 3 [0006] to page 4 [0008]).

However, for use for flexible organic EL substrates, they are still unsatisfactory in point of the bas-barrier capability thereof since the adhesion between the organic layer and the inorganic layer therein is insufficient; and therefore it is desired to further improve them.

SUMMARY OF THE INVENTION

The present invention has been made in consideration of the above-mentioned problems, and one object of the invention is to provide a gas-barrier laminate film that has a water vapor-barrier property necessary for organic EL devices and is therefore applicable to even flexible organic EL devices. Another object of the invention is to provide a durable image display device comprising the gas-barrier laminate film.

The first object of the invention may be attained by a gas-barrier laminate film comprising at least one inorganic layer and at least one organic layer comprising a polymer of an acrylic monomer as a main ingredient on a substrate film, wherein the organic layer comprises a polymerization product of a bi- or more-functional polymerizing monomer having at least one sulfonyl group.

Preferably in the gas-barrier laminate film of the invention, the inorganic layer exhibiting a gas-barrier capability comprises an inorganic compound of a metal oxide or a metal nitride as a main ingredient thereof. More preferably, it comprises a metal oxide, nitride or composite of silicon, aluminium, titanium, zirconium or tin, as the essential ingredient thereof.

Preferably in the gas-barrier laminate film of the invention, the inorganic layer and the organic layer are alternately laminated on the substrate film. For further improving the adhesiveness between the organic layer and the inorganic layer, the surface of the organic layer to be in contact with the inorganic layer may be subjected to plasma treatment.

Preferably, the gas-barrier laminate film of the invention has an oxygen permeability at 38° C. and a relative humidity of 90% of at most 0.01 $ml/m^2/day \cdot atm$, and has a water vapor permeability at 38° C. and a relative humidity of 90% of at most 0.01 $g/m^2/day$.

The second object of the invention may be attained by an image display device comprising the above-mentioned gas-barrier laminate film. The gas-barrier laminate film is useful as a substrate for image display devices, especially as a substrate for organic EL devices.

The gas-barrier laminate film of the invention is highly resistant to moisture penetration thereinto. Since the image display device of the invention comprises the gas-barrier laminate film of the invention, it has the advantages of high-definition image display capability and durability.

BEST MODE FOR CARRYING OUT THE INVENTION

The gas-barrier laminate film of the invention and its applications are described in detail hereinunder. The description of the constitutive elements of the invention given hereinunder is for some typical embodiments of the invention, to which, however, the invention should not be limited. In this description, the numerical range expressed by the wording "a number to another number" means the range that falls between the former number indicating the lowermost limit of the range and the latter number indicating the uppermost limit thereof.

<<Gas-Barrier Laminate Film>>

[Layer Constitution of Gas-Barrier Laminate Film]

The gas-barrier laminate film of the invention has at least one inorganic layer and at least one organic layer that comprises, as the essential ingredient thereof, a polymer of an acrylic monomer, on a substrate film. The inorganic layer and the organic layer may be laminated on one surface alone or on both surfaces of the substrate film. In case where they are laminated on both surfaces of the film, then the number of the inorganic layer and the organic layer laminated on the two surfaces may be the same or different. On the substrate film, an inorganic layer may be formed first and then an organic layer may be formed thereon; or an organic layer may be formed first and then an inorganic layer may be formed thereon. Preferred is an embodiment where an organic film is first formed on a substrate film and then an inorganic film is formed thereon for the purpose of making the surface of the resulting laminate film have the surface smoothness of the inorganic layer. In case where a plurality of organic layers and inorganic layers are formed on a substrate film, it is desirable that the organic layer and the inorganic layer are formed alternatively. A plurality of composite layers of lamination of an inorganic layer and an organic layer may be formed on the substrate film. The gas-barrier laminate film of the invention may additionally have any other organic layer not satisfying the requirement of the invention or a functional layer to be mentioned hereinunder. The details of the functional layer are described below.

In the following, the layers constituting the gas-barrier laminate film of the invention are described in detail.

[Organic Layer]

(Characteristics of Organic Layer)

The organic layer that constitutes the gas-barrier laminate film of the invention is a layer comprising, as the essential ingredient thereof, a polymer of an acrylic monomer. The organic layer that constitutes the gas-barrier laminate film of the invention comprises a polymer product of a sulfonyl group-having, bi- or more-functional polymerizing monomer.

(Sulfonyl Group-Having Polymerizing Monomer)

The sulfonyl group-having, bi- or more-functional polymerizing monomer to be used in the organic layer in the invention is described. The sulfonyl group-having, bi- or more-functional polymerizing monomer for use in the invention includes compounds of the following formula (I):

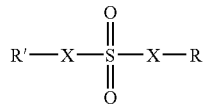

Formula (1)

In formula (I), X represents a divalent linking group comprising at least one group selected from a divalent saturated hydrocarbon group having from 1 to 20 carbon atoms, an alkenylene group having from 2 to 20 carbon atoms, an aralkylene group having from 7 to 20 carbon atoms, and an arylene group having from 6 to 20 carbon atoms; two X's may be the same or different; R and R' each independently represent a polymerizable group (polymerizing group); and R and R' may be the same or different.

Examples of the divalent saturated hydrocarbon group having from 1 to 20 carbon atoms are a methylene group, an ethylene group, an n-propylene group, an i-propylene group, a butylene group (n-butylene group, i-butylene group, tert-butylene group, sec-butylene group), a pentylene group (e.g., n-pentylene group, i-pentylene group, neopentylene group, cyclopentylene group), a hexylene group (e.g., n-hexylene group, i-hexylene group, cyclohexylene group), a heptylene group (e.g., n-heptylene group, i-heptylene group), an octylene group (e.g., n-octylene group, i-octylene group, tert-octylene group), a nonylene group (e.g., n-nonylene group, i-nonylene group), a decylene group (e.g., n-decylene group, i-decylene group), an undecylene group (e.g., n-undecylene group, i-undecylene group), a dodecylene group (e.g., n-dodecylene group, i-dodecylene group). In consideration of the working balance in shaping the polymer, preferred is a saturated hydrocarbon group having from 1 to 16 carbon atoms, and more preferred is a saturated hydrocarbon group having from 1 to 12 carbon atoms.

The alkenylene group having from 2 to 20 carbon atoms includes an acyclic alkenylene group and a cyclic alkenylene group. Their examples are a vinylene group, a propenylene group, a butenylene group, a pentenylene group, a hexenylene group, a cyclohexenylene group, a cyclohexenylethylene group, a norbornenylethylene group, a heptenylene group, an octenylene group, a nonenylene group, a decenylene group, an undecenylene group, a dodecenylene group. In consideration of the working balance in shaping the polymer, preferred is a an alkenylene group having from 2 to 16 carbon atoms, and more preferred is an alkenylene group having from 2 to 12 carbon atoms.

Examples of the aralkylene group having from 7 to 20 carbon atoms are a benzylene group, a phenethylene group. It also includes a benzylene group and a phenethylene group mono-substituted or poly-substituted with one or more alkyl groups having from 1 to 13 carbon atoms, preferably from 1 to 8 carbon atoms.

Examples of the arylene group having from 6 to 20 carbon atoms are a phenylene group, a tolylene group. It also includes a phenylene group, a tolylene group and a xylylene group substituted with an alkyl group having from 1 to 14 carbon atoms, preferably from 1 to 8 carbon atoms.

The saturated hydrocarbon group, the alkenylene group, the aralkylene group and the arylene group may be substituted. The substituent for them includes, for example, an alkyl group, an alkyloxy group, a hydroxyl group, a halogen atom.

The polymerizing group for R and R' is preferably an acryl-type group such as an acryloyl group, a methacryloyl group, an acrylamide group.

Of the compounds of formula (1), preferred are those where X is a linking group that comprises an alkylene group or an arylene group; and R and R' each are a polymerizing functional group comprising any of an acryloyl group, a methacryloyl group, an acrylamido group or a methacrylamido group.

Of the compounds of formula (1), more preferred are those where X is an arylene group; and R and R' each are an acryloyl group.

Examples of the compounds of formula (1) are mentioned below. In the chemical structural formulae given below, the substituent R is a hydrogen atom or a methyl group, indicating two types of an acryloyl (acrylamido) group and a methacryl (methacrylamido) group, respectively. In consideration of the curability of the polymer, preferred is an acryloyl (acrylamide) group. The sulfonyl group-having, bi- or more-functional polymerizing monomer that may be used in the organic layer in the invention should not be limitatively interpreted by the compounds exemplified below.

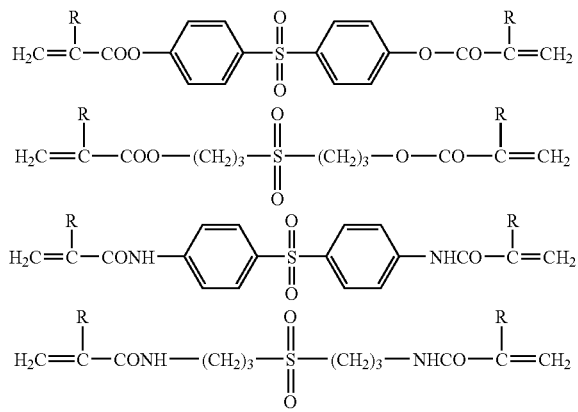

(Binder)

Preferably, the above-mentioned, sulfonyl group-having, bi- or more-functional polymerizing monomer is used, as mixed with a binder capable of reacting with the polymerizing group R, R'. The binder capable of reacting with the polymerizing group includes a thermosetting resin and radiation-curable resin.

The thermosetting resin includes an epoxy resin and a radiation-curable resin. The epoxy resin includes a polyphenol-type resin, a bisphenol-type resin, a halogenobisphenol-type resin, a novolak-type resin. The curing agent for curing the epoxy resin may be any known curing agent. For example, it includes an amine-type curing agent, a polyaminoamide-type curing agent, an acid-type curing agent, an acid anhydride-type curing agent, an imidazole-type curing agent, a mercaptan-type curing agent and a phenol resin-type curing agent. Above all, preferred are acid anhydrides and acid anhydride structure-having polymers or aliphatic amines from the viewpoint of their solvent resistance, optical properties and thermal properties; and more preferred are acid anhydrides and acid anhydride structure-having polymers. In the invention, one or more such thermosetting resins may be used either singly or as combined. Preferably, a suitable amount of a curing catalyst such as known tertiary amines or imidazoles is added to the thermosetting resin.

The radiation-curable resin is a resin that cures through exposure to radiations such as UV rays or electron rays. Concretely, it is a resin that comprises an unsaturated double bond such as an acryloyl group, a methacryloyl group or a vinyl group in the molecule or the monomer structure thereof. Of those, more preferred is an acrylic resin having an acryloyl group or the like. In the invention, one or more radiation-curable resins may be used either singly or as combined; however, preferably used is an acrylic resin having at least two acryloyl groups or the like in the molecule or the monomer structure thereof. The bi- or more-functional acrylate resin includes, for example, tripropylene glycol diacrylate, dipentaerythritol hexaacrylate, pentaerythritol tetraacrylate, urethane acrylate, ester acrylate, epoxy acrylate, to which, however, the invention should not be limited. In particular, tripropylene glycol diacrylate and urethane acrylate are favorably used as having the ability to make the organic layer flexible and to improve the folding-resistant strength of the film.

In case where a UV-curing method is applied to the radiation-curable resin, a suitable amount of a known optical reaction initiator may be added to the radiation-curable resin.

The organic layer that constitutes the gas-barrier laminate film of the invention is preferably a layer that comprises a copolymer of the above-mentioned, sulfonyl group-having, bi- or more-functional polymerizing monomer and any other acrylic polymerizing compound. Especially preferred is an embodiment where the polymerizing group R, R' in the sulfonyl group-having, bi- or more-functional polymerizing monomer is an acryloyl group, and the binder capable of reacting with the group is a bi- or more-functional acrylate.

(Composition and Thickness of Organic Layer)

Preferably, the proportion of the sulfonyl group-having, bi- or more-functional polymerizing monomer in the organic layer is from 1 to 80% by mass, more preferably from 5 to 70% by mass, even more preferably from 10 to 60% by mass. When the proportion of the monomer therein is at least 1% by mass, then the organic layer may have sufficient adhesiveness to the inorganic layer formed adjacent thereto, and therefore the laminate film may have sufficient gas-barrier capability. When the proportion of the monomer is at most 80% by mass, then the film may have sufficient strength.

The organic layer may comprise an additive. One example of the additive that may be added to the organic layer is a reactive binder capable of reacting with the polymerizing group. Preferably, the additive content is at most 30% by mass, more preferably at most 20% by mass, even more preferably at most 10% by mass.

Not specifically defined, the thickness of the organic layer in the invention is preferably within a range of from 10 nm to 5 μm, more preferably within a range of from 50 nm to 2 μm, even more preferably within a range of from 100 nm to 1 μm.

(Method for Forming Organic Layer)

For forming the organic layer in the invention, employable is a coating method or a vacuum evaporation film formation method. Not specifically defined, the vacuum evaporation film formation method is preferably vapor deposition or plasma CVD, and more preferably resistance-heating vapor deposition in which the film-forming speed with a polymerizing monomer composition is easy to control.

In case where the organic layer is formed in a coating mode, various conventional coating methods are employable, including, for example, a roll-coating method, a gravure-coating method, a knife-coating method, a dipping method, a curtain flow-coating method, a spraying method, a bar-coating method.

There is given no limitation at all to the method for crosslinking the polymerizing monomer in the invention; preferably, however, the monomer is crosslinked through exposure to active energy rays such as electron rays or UV rays, since the exposure device may be readily fitted to a vacuum chamber and since the monomer may be rapidly crosslinked into a polymer having an increased molecular weight. The active energy rays are meant to indicate radiations capable of transmitting energy through exposure thereto, including, for example, UV rays, X rays, electron rays, microwaves; and their type and the energy from them may be suitably selected depending on their use.

In the invention, preferably, the organic layer is subjected to surface treatment such as plasma treatment. In particular, when a sulfonyl group-having polymerizing monomer is used or when an inorganic layer is formed on the organic layer, then the organic layer is preferably subjected to plasma treatment. In the plasma treatment in the invention, used is oxygen gas, nitrogen gas, argon gas or helium gas as the plasma gas, and the plasma treatment is for surface-modifying the resin substrate or the organic layer. In the invention, when the surface of the organic layer is subjected to such plasma treatment, more preferably used is oxygen gas, or a mixed gas of oxygen gas with an inert gas such as nitrogen gas, argon gas or helium gas. The plasma treatment may be attained, for example, using an ordinary plasma CVD device, in which oxygen gas or oxygen gas-containing mixed gas may be introduced into the chamber.

[Inorganic Layer]

(Constitutive Material of Inorganic Layer).

The inorganic layer that constitutes the gas-barrier laminate film of the invention is a layer of an inorganic substance. Preferably, the inorganic layer is a layer of a metal oxide, nitride or oxinitride with silicon, aluminium, titanium, zirconium, tin or the like, and it may be formed of their composite.

(Thickness of Inorganic Layer)

Preferably, the thickness of the inorganic layer is from 30 nm to 1 μm, more preferably from 50 to 200 nm. When the thickness of the inorganic layer is from 50 nm to 1 μm, then the layer is hardly influenced by the defective part thereof or by the part thereof having a low crystal density, and it may ensure high gas-barrier capability. In such a case, the inorganic layer is broken little even when it is deformed, and it is therefore favorable in practical use.

(Method for Forming Inorganic Layer)

For forming the inorganic layer, employable are physical vapor-phase deposition methods (PVD) such as a vapor evaporation method, a sputtering method or an ion-plating method; various chemical vapor-phase deposition methods (CVD); and liquid-phase deposition methods such as a plating method or a sol-gel method. Of those, preferred are chemical vapor-phase deposition methods (CVD) and physical vapor-phase deposition methods (PVD) in which thermal influences on the substrate film in inorganic layer formation thereon may be evaded, the producing speed is high and a thin and uniform film is easy to form. Also preferred is a sol-gel method for inorganic layer formation, in which a thick film is easy to form. The thick film as referred to herein has a thickness of from 100 nm to 1 μm.

[Substrate Film]

(Properties of Substrate Film)

The substrate film to be used in the gas-barrier laminate film of the invention is preferably formed of a material resistant to heat, in order that the laminate film is applicable to image display devices to be mentioned below. Preferably, Preferably, the substrate film is a heat-resistant transparent plastic film having a glass transition temperature (Tg) of 100° C. or higher and/or a linear thermal expansion coefficient of at most 40 ppm/° C. Tg and the linear expansion coefficient may be varied by changing the additives to the film.

(Polymer)

The polymer for the substrate film may be any of thermoplastic polymer and thermosetting polymer. The thermoplastic polymer is preferably such that Tg of the polymer alone is from 120 to 300° C., more preferably from 160 to 250° C. The thermoplastic resin of the type includes the following (the parenthesized data indicate Tg): Polyethylene naphthalate (PEN: 120° C.), polycarbonate (PC: 140° C.), alicyclic polyolefin (e.g., Nippon Zeon's Zeonoa 1600: 160° C.), polyarylate (PAr: 210° C.), polyethersulfone (PES: 220° C.), polysulfone (PSF: 190° C.), cycloolefin copolymer (COC: compound described in JP-A-2001-150584: 162° C.), fluorene ring-modified polycarbonate (BCF-PC: compound described in JP-A-2000-227603: 225° C.), alicyclic-modified polycarbonate (IP-PC: compound described in JP-A-2000-227603: 205° C.), acryloyl compound (described in JP-A-2002-80616: 300° C. or higher). Alicyclic polyolefin is especially preferred for transparent films.

The thermosetting polymer includes epoxy resin and radiation-curable resin. The epoxy resin includes a polyphenol-type resin, a bisphenol-type resin, a halogenobisphenol-type resin, and a novolak-type resin. The curing agent for curing the epoxy resin may be any known one. For example, it includes amines, polyamino-amides, acids and acid anhydrides, imidazoles, mercaptans and phenolic resins. Above all, preferred are acid anhydrides, acid anhydride structure-having polymers and aliphatic amines, from the viewpoint of their solvent resistance, optical properties and thermal properties; and more preferred are acid anhydrides and acid anhydride structure-having polymers. One or more such thermosetting resins may be used in the invention either singly or as combined. In addition, a suitable amount of a curing catalyst such as a known tertiary amine or imidazole is preferably added to the polymer.

The radiation-curable resin is a resin that cures through exposure to radiations such as UV rays or electron rays. Concretely, it is a resin that comprises an unsaturated double bond such as an acryloyl group, a methacryloyl group or a vinyl group in the molecule or the monomer structure thereof. Of those, more preferred is an acrylic resin having an acryloyl group or the like. In the invention, one or more radiation-curable resins may be used either singly or as combined; however, preferably used is an acrylic resin having at least two acryloyl groups or the like in the molecule or the monomer structure thereof. The bi- or more-functional acrylate resin includes, for example, urethane acrylate, ester acrylate, epoxy acrylate, to which, however, the resin usable in the invention should not be limited.

In case where the radiation-curable resin is cured through exposure to UV rays, a suitable amount of a known optical reaction initiator may be added to the radiation-curable resin.

(Additive)

A hydrolyzed alkoxysilane or a silane-coupling agent may be added to the above-mentioned epoxy resin and radiation-curable resin for the purpose of further enhancing the interaction with polymer molecules. The silane-coupling agent is preferably such that one has a hydrolyzable reactive group such as a methoxy group, an ethoxy group or an acetoxy group and the other has an epoxy group, a vinyl group, an amino group, a halogen atom or a mercapto group. In this case, the agent preferably has a vinyl group having the same reactive group for the purpose of fixing to the main ingredient resin. For example, herein employable are Shin-etsu Chemical Industry's KBM-503 and KBM-803, and Nippon Unicar's A-187. Preferably, its amount to be added to the resin is from 0.2 to 3% by mass.

(Transparency)

The gas-barrier laminate film of the invention is favorably used in display devices such as image display devices. In case where the gas-barrier laminate film is used in image display devices, the substrate film therein is preferably a transparent substrate film concretely having a light transmittance of at least 80%, more preferably at least 85%, even more preferably at least 90%. When the light transmittance of the substrate film is at least 80%, then the laminate film may be favorably used as a substrate film in organic EL devices to be mentioned hereinunder.

Even for display applications, the laminate film is not always required to be transparent when it is used not on the viewers' side of displays or when it is used for non-transparent wrapping or packaging materials. In such applications, the substrate film may be formed of a non-transparent material. For example, the non-transparent material includes polyimide, polyacrylonitrile, and known liquid-crystal polymer.

The light transmittance used in this description as the criterion of transparency may be determined by analyzing the laminate film according to the method described in JIS-K7105 and using an integrating sphere-type light transmittance meter, thereby measuring the total light transmittance and the scattered light quantity through the film, followed by subtracting the diffused transmittance from the total light transmittance.

[Other Layers]

(Functional Layers)

The gas-barrier laminate film of the invention may have various functional layers, in addition to the inorganic layer and the sulfonyl group-having bi- or more-functional organic layer. Examples of the functional layers are optical functional layers such as an antireflection layer, a polarizing layer, a color filter, and a light emission efficiency-improving layer; mechanical functional layers such as a hard coat layer, and a stress-relaxing layer; electric functional layers such as an antistatic layer, and a conductive layer; and an antifogging layer; a contamination-resistant layer; a printable layer. In addition, an organic layer not satisfying the condition that it comprises a polymer of an acrylic monomer as the essential ingredient thereof and it comprises a polymer of a sulfonyl group-having bi- or more-functional polymerizing monomer (hereinafter this may be referred to as an organic layer not satisfying the condition of the invention) may be disposed in the laminate film of the invention. The additional layer may be formed in any site between the substrate film and the inorganic layer, between the substrate film and the organic layer, or between the inorganic layer or the organic layer, or may be formed as an outermost layer of the laminate film. It may also be formed on the side of the substrate film on which the inorganic layer and/or the organic layer are not formed. Different functional layers may be formed adjacent to each other.

(Gas-Barrier Laminate Layer)

The gas-barrier laminate film of the invention may have a gas-barrier laminate layer that comprises an inorganic layer, an organic layer not satisfying the condition of the invention and an organic layer laminated in that order. The inorganic layer as referred to herein is preferably an inorganic layer having the same gas-barrier level as that of the above-mentioned inorganic layer. The gas-barrier laminate layer may be effective for preventing water molecules from penetrating into the film thereby for further increasing the gas-barrier level of the gas-barrier laminate film of the invention. Preferably, the gas-barrier laminate layer is formed on the side (opposite side) of the substrate film opposite to the side (surface side) thereof on which the inorganic layer and the organic layer that satisfies the condition of the invention are formed. The gas-barrier laminate layer thus formed on the opposite side may prevent water molecules from penetrating into the film through the opposite side thereof. As a result, the dimensional change of the gas-barrier laminate film may be thereby prevented, and the surface layer may be protected from stress concentration therein and may be prevented from being broken, and therefore the durability of the laminate film applied to image display devices and others may be further more improved.

<<Image Display Device>>

The gas-barrier laminate film of the invention has many applications. In particular, it is favorably built in image display devices. Image display devices as referred to herein include circularly-polarizing plate, liquid-crystal display device, electronic paper, organic EL device. Though the use of the gas-barrier laminate film of the invention is not specifically defined, it is favorably used as a substrate or a sealant film for display devices. Examples of using of the laminate film in image display devices are concretely described hereinunder.

[Circularly-Polarizing Plate]

The circularly-polarizing plate may be fabricated by laminating a λ/4 plate and a polarizing plate on the gas-barrier film of the invention. In this case, they are so laminated that the slow axis of the λ/4 plate could cross the absorption axis of the polarizing plate at an angle of 45°. The polarizing plate is preferably stretched in the 45°-direction relative to the machine direction (MD), and for example, those described in JP-A-2002-865554 are favorably used for it.

[Liquid-Crystal Display Device]

The liquid-crystal display device may be grouped into a reflection-type liquid-crystal display device and a transmission-type liquid-crystal display device.

The reflection-type liquid-crystal display device has a constitution of a lower substrate, a reflection electrode, a lower alignment film, a liquid-crystal layer, an upper alignment film, a transparent electrode, an upper substrate a λ/4 plate, and a polarizing film laminated in that order from the lower side thereof. The gas-barrier laminate film of the invention may be used as the transparent electrode and the upper substrate. When the reflection-type liquid-crystal display device is designed to have a color display function, then a color filter layer is disposed preferably between the reflection electrode and the lower alignment film, or between the upper alignment film and the transparent electrode.

The transmission-type liquid-crystal display device has a constitution of a backlight, a polarizing plate, a λ/4 plate, a lower transparent electrode, a lower alignment film, a liquid-crystal layer, an upper alignment film, an upper transparent electrode, an upper substrate, a λ/4 plate and a polarizing film laminated in that order from the lower side thereof. Of those, the gas-barrier laminate film of the invention may be used as the upper transparent electrode and the upper substrate. When the transmission-type liquid-crystal display device is designed to have a color display function, then a color filter layer is disposed preferably between the lower transparent electrode and the lower alignment film, or between the upper alignment film and the upper transparent electrode.

Not specifically defined, the structure of the liquid-crystal layer is, for example, preferably a TN (twisted nematic) type, STN (super-twisted nematic) type, HAN (hybrid aligned nematic) type, VA (vertical alignment) type, ECB (electrically-controlled birefringence) type, OCB (optically-compensatory bend) type, or CPA (continuous pinwheel alignment) type structure.

[Organic EL Device]

The organic EL device has a cathode and an anode on a substrate, and has an organic compound layer comprising an organic light-emitting layer (hereinafter this may be simply referred to as "light-emitting layer") between the two electrodes. Because of the property of the luminescent device, at least one electrode of the anode and the cathode is preferably transparent.

When the gas-barrier laminate film of the invention is used in organic EL, etc., then it is desirable to refer to ane employ the descriptions given in JP-A-11-335661, JP-A-11-335368, JP-A-2001-192651, JP-A-2001-192652, JP-A-2001-192653, JP-A-2001-335776, JP-A-2001-247859, JP-A-2001-181816, JP-A-2001-181617, JP-A-2002-181816, JP-A-2002-181617, JP-A-2002-056976, JP-A-2001-148291, JP-A-2001-221916 and JP-A-2001-231443. The gas-barrier laminate film of the invention may be used as the substrate film and/or the protective film in constructing organic EL devices.

EXAMPLES

The characteristics of the invention are described more concretely with reference to the following Examples and Comparative Examples. In the following Examples, the material used, its amount and the ratio, the details of the treatment and the treatment process may be suitably modified or changed not overstepping the sprit and the scope of the invention. Accordingly, the invention should not be limitatively interpreted by the Examples mentioned below.

<<Production and Evaluation of Laminate Film>>

Example 1

One g of a sulfonyl group-having acrylic monomer (diphenylsulfone 4,4'-diacrylate), 9 g of a photopolymerizing acrylate to be mixed with it, tripropylene glycol diacrylate (by Daicel Cytec), and 0.1 g of a photopolymerization initiator (Ciba Specialty Chemicals' Irgacure 907) were prepared, and these were dissolved in 190 g of methyl ethyl ketone to give a coating liquid. Using a wire bar, the coating liquid was applied onto a 100 μm-thick polyethylene naphthalate resin substrate (by Teijin-DuPont, Teonex Q65), and then exposed to UV rays from an air-cooled, 160 W/cm metal halide lamp (by Eyegraphics) at an illumination intensity of 350 mW/cm$^2$ and at a dose of 500 mJ/cm$^2$ in a nitrogen-purged atmosphere having an oxygen concentration of at most 0.1%, thereby forming an organic layer having a thickness of 500 nm. Further, a 100 nm-thick silicon oxide film was formed on the organic layer according to a sputtering method, thereby producing a laminate film.

Example 2

A laminate film was produced in the same manner as in Example 1, for which, however, the blend ratio of the acrylic monomer to tripropylene glycol diacrylate was changed to 1/1 (by mass).

Example 3

A laminate film was produced in the same manner as in Example 1, for which, however, the surface of the organic layer was subjected to plasma treatment for 5 minutes under the condition of an oxygen flow rate of 2 sccm, an argon flow rate of 18 sccm and a chamber inner pressure of 0.1 Pa, and then a silicon oxide film was formed thereon.

Example 4

A laminate film was produced in the same manner as in Example 2, for which, however, the surface of the organic layer was subjected to the same plasma treatment as in Example 3.

Comparative Example 1

A 100 nm-thick silicon oxide film was formed on the above resin substrate according to a sputtering method, thereby producing a laminate film of resin substrate/inorganic layer.

Comparative Example 2

A laminate film was produced in the same manner as in Comparative Example 1, for which, however, the substrate was subjected to the same plasma treatment as in Example 3 before forming an inorganic layer thereon in the same manner as in Comparative Example 1.

Comparative Example 3

A laminate film was produced in the same manner as in Example 1, for which, however, an acrylate monomer (Kyoeisha Chemical's Light Acrylate BEPG-A) was used in place of the monomer used in Example 1.

Comparative Example 4

A laminate film was produced in the same manner as in Comparative Example 3, for which, however, the substrate was subjected to the same plasma treatment as in Example 3 before forming an inorganic layer thereon in the same manner as in Comparative Example 3.

(Evaluation)

The oxygen permeability and the water vapor permeability at 38° C. and a relative humidity of 10% or 90% of the thus-obtained laminate films were measured, according to a MOCON process (oxygen: MOCON OX-TRAN 2/20L, water vapor: MOCON PERMATRAN-W(3)/31). The results are shown in the following Table.

TABLE 1

| Film | Oxygen Permeability 38° C., 10% RH (ml/m$^2$ · day · atm) | Oxygen Permeability 38° C., 90% RH (ml/m$^2$ · day · atm) | Water Vapor Permeability 38° C., 90% RH (g/m$^2$ · day) |
| --- | --- | --- | --- |
| Example 1 | 0.03 | 0.03 | 0.03 |
| Example 2 | 0.02 | 0.02 | 0.01 |
| Example 3 | 0.01 | 0.02 | 0.01 |
| Example 4 | 0.01 | 0.01 | less than 0.005 |
| Comparative Example 1 | 0.30 | 0.50 | 0.30 |
| Comparative Example 2 | 0.30 | 0.40 | 0.30 |

TABLE 1-continued

| Film | Oxygen Permeability 38° C., 10% RH (ml/m²·day·atm) | Oxygen Permeability 38° C., 90% RH (ml/m²·day·atm) | Water Vapor Permeability 38° C., 90% RH (g/m²·day) |
|---|---|---|---|
| Comparative Example 3 | 0.12 | 0.15 | 0.18 |
| Comparative Example 4 | 0.20 | 0.25 | 0.18 |

Note)
"less than 0.005" means the permeability level lower than the detection limit of the current detector.

From Table 1, it is understood that the gas-barrier laminate films comprising an inorganic layer and a sulfonyl group-having organic layer (Examples 1 to 4) are better than the barrier films not having an organic layer or the laminate films comprising an inorganic layer and a sulfonyl group-free organic layer (Comparative Examples 1 to 4) in point of the oxygen permeation resistance and the water vapor permeation resistance. In particular, the laminate film, for which the blend ratio of the sulfonyl group-having acrylate monomer to the acrylate monomer to be a binder was 1/1 (by mass) and the surface of the organic layer was subjected to oxygen plasma treatment before forming an inorganic layer thereon (Example 4), had an excellent gas-barrier level. From these results, it is understood that the gas-barrier laminate film of the invention has an excellent gas-barrier capability as having a laminate structure of an inorganic layer and a sulfonyl group-having organic layer, and that, when the organic layer is subjected to plasma treatment before forming an inorganic layer thereon, the resulting laminate film may have a much more improved gas-barrier capability.

<<Construction of Substrate and Organic EL Device>>

The gas-barrier laminate film produced in Example 4 was put into a vacuum chamber. Using an ITO target, a transparent conductive layer (transparent electrode) of a thin ITO film having a thickness of 200 nm was formed on this, according to a DC magnetron sputtering method. An aluminium lead wires was connected to the transparent electrode (ITO) of the film, thereby constructing a laminate structure. According to a spin-coating method, an aqueous dispersion of polyethylenedioxythiophene-polystyrenesulfonic acid (Bayer's Baytron P, having a solid content of 1.3% by mass) was applied onto the surface of the transparent electrode, and then dried in vacuum at 150° C. for 2 hours to thereby form thereon a hole-transporting, thin organic layer having a thickness of 100 nm. This is a substrate X.

On the other hand, a coating solution for light-emitting thin organic layer, having the composition mentioned below, was applied onto one surface of a temporary support of polyethersulfone (Sumitomo Bakelite's Sumilite FS-1300) having a thickness of 188 μm, using a spin coater, and then this was dried at room temperature to thereby form a thin, light-emitting organic layer having a thickness of 13 nm on the temporary support. This is a transfer material Y.

| | |
|---|---|
| Polyvinylcarbazole (Mw = 63000, by Aldrich) | 40 parts by mass |
| Tris(2-phenylpyridine)iridium complex(ortho-metallized complex) | 1 part by mass |
| 1,2-Dichloroethane | 3200 parts by mass |

The transfer material Y was put on the substrate X with the thin organic layer of the former facing the light-emitting thin organic layer of the latter, and heated and pressed between a pair of hot rollers at 160° C. and 0.3 MPa and at a rate of 0.05 m/min. With that, the temporary support was peeled away, whereby the light-emitting thin organic layer was transferred onto the upper surface of the substrate X. This is a substrate XY.

On one surface of a polyimide film having a size of 25 mm×25 mm and a thickness of 50 μm (Ube Kosan's UPILEX-50S), put was a patterned mask (having a light-emitting area of 5 mm×5 mm). According to a vapor evaporation method, Al was deposited on the film to form thereon a coating layer having a thickness of 250 nm. Further according to a vapor evaporation method, LiF was deposited thereon, having a thickness of 3 nm. Using a spin coater, a coating solution for electron-transporting thin organic film, having the composition mentioned below, was applied onto the thus-obtained laminate structure, and dried in vacuum at 80° C. for 2 hours, thereby forming an electron-transporting thin organic layer having a thickness of 15 nm on LiF. Then, an aluminium lead wire was connected to the Al electrode, and this is a substrate Z.

| | |
|---|---|
| Polyvinylbutyral 2000L (Mw = 2000, by Denki Kagaku Kogyo) | 10 parts by mass |
| 1-Butanol | 3500 parts by mass |
| Electron-transporting compound having the following structure | 20 parts by mass |

Electron-Transporting Compound:

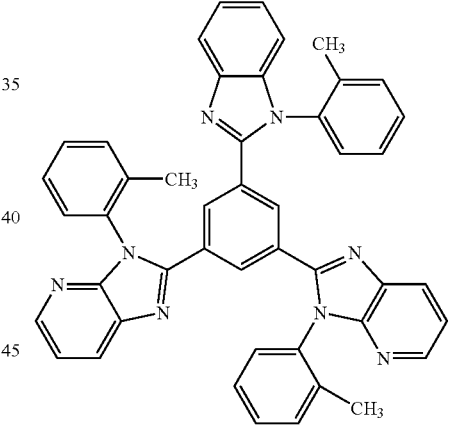

The substrate XY and the substrate Z were put on each other in such a manner that their electrodes could face to each other via the light-emitting thin organic layer therebetween. Using a pair of hot rollers, this was heated and pressed at 160° C. and 0.3 MPa and at a rate of 0.05 m/min, whereby the two substrates were stuck together to give an organic EL device.

Using Source Measure Unit 2400 Model (by Toyo Technica), a direct-current voltage was applied to the thus-obtained organic EL device, and the organic EL device of the invention well emitted light. After fabricated, the organic EL device was kept at 25° C. and a relative humidity of 10% and 90% for 12 hours each, and it was thus aged for 10 days, and then driven in the same manner as above for light emission. As a result, the device did not deteriorate at all.

The gas-barrier laminate film of the invention has a high gas-barrier capability. Accordingly, the film may be effectively applicable to various articles that are required to be shielded from water vapor and oxygen, and to flexible articles. In addition, the invention can provide a high-definition image display device of high durability that comprises the gas-barrier film of the invention, and it is favorably applicable to flexible high-definition displays. Accordingly, the industrial applicability of the invention is great.

While the present invention has been described in detail and with reference to specific embodiments thereof, it will be apparent to one skilled in the art that various changes and modifications can be made therein without departing from the spirit and scope thereof.

The present disclosure relates to the subject matter contained in Japanese Patent Application No. 266935/2006 filed on Sep. 29, 2006, which is expressly incorporated herein by reference in its entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A gas-barrier laminate film comprising at least one inorganic layer and at least one organic layer comprising a polymer of an acrylic monomer as a main ingredient on a substrate film,
wherein said polymer of an acrylic monomer is the polymerization product of a bi- or more-functional polymerizing monomer having at least one sulfonyl group.

2. The gas-barrier laminate film according to claim 1, wherein the polymerizing monomer is a bi- or more-functional acrylic monomer.

3. The gas-barrier laminate film according to claim 1, wherein the content of the polymerizing monomer having a sulfonyl group is from 1 to 80% by mass of all the monomers to form the polymerization product.

4. The gas-barrier laminate film according to claim 1, wherein the organic layer is subjected to plasma treatment, and the inorganic layer is formed on the organic layer.

5. The gas-barrier laminate film according to claim 4, wherein the plasma treatment is effected with oxygen gas, or with a mixed gas of oxygen gas with any of nitrogen gas, argon gas and helium gas.

6. The gas-barrier laminate film according to claim 1, wherein the inorganic layer and the organic layer are laminated in that order on the substrate film.

7. The gas-barrier laminate film according to claim 1, wherein the organic layer and the inorganic layer are laminated in that order on the substrate film.

8. The gas-barrier laminate film according to claim 1, which comprises two or more composite laminate layers of the inorganic layer and the organic layer.

9. The gas-barrier laminate film according to claim 1, which has an oxygen permeability at 38° C. and a relative humidity of 90% of at most 0.01 ml/m²/day·atm, and has a water vapor permeability at 38° C. and a relative humidity of 90% of at most 0.01 g/m²/day.

10. A substrate for image display devices, comprising the gas-barrier laminate film of claim 1.

11. An image display device, comprising the gas-barrier laminate film of claim 1.

12. An organic electroluminescent device, comprising the gas-barrier laminate film of claim 1.

13. The gas-barrier laminate film according to claim 1, wherein the bi- or more-functional polymerizing monomer having at least one sulfonyl group is represented by Formula (1):

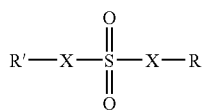

Formula (1)

wherein X represents a divalent linking group comprising at least one group selected from the group consisting of a divalent saturated hydrocarbon group having from 1 to 20 carbon atoms, an alkenylene group having from 2 to 20 carbon atoms, an aralkylene group having from 7 to 20 carbon atoms, and an arylene group having from 6 to 20 carbon atoms; the two X's may be the same or different; R and R' each independently represent a polymerizable or polymerizing group; and R and R' may be the same or different.

* * * * *